(12) United States Patent
Arsenault (10) Patent No.: US 8,651,062 B2
(45) Date of Patent: Feb. 18, 2014

(54) EASY TO INSERT PET CARRIER

(76) Inventor: Marc H. Arsenault, Jamaica Plain, MA (US)

( * ) Notice: Subject to any disclaimer, the term of this patent is extended or adjusted under 35 U.S.C. 154(b) by 126 days.

(21) Appl. No.: 12/965,313

(22) Filed: Dec. 10, 2010

(65) Prior Publication Data

US 2012/0145088 A1  Jun. 14, 2012

(51) Int. Cl.
*A01K 1/00* (2006.01)
(52) U.S. Cl.
USPC .......................................... 119/497; 119/453
(58) Field of Classification Search
USPC ........ 119/28.5, 416, 453, 454, 473, 474, 494,
119/496, 497, 498; D30/108, 109
See application file for complete search history.

(56) References Cited

U.S. PATENT DOCUMENTS

| | | | | |
|---|---|---|---|---|
| 1,659,839 | A | * | 2/1928 | Smith ................................. 4/293 |
| 2,503,525 | A | | 4/1950 | Sutherland |
| 3,036,414 | A | | 11/1962 | Huber |
| 3,063,414 | A | * | 11/1962 | Huber ........................... 119/496 |
| 3,211,195 | A | | 10/1965 | Porter |
| 3,650,551 | A | * | 3/1972 | Akers ......................... 285/143.1 |
| 3,767,268 | A | | 10/1973 | Stucky |
| 3,778,922 | A | | 12/1973 | Clark |
| 3,793,989 | A | * | 2/1974 | Clark ............................ 119/165 |
| RE28,708 | E | | 2/1976 | Reynolds |
| 4,121,539 | A | | 10/1978 | Moore |
| 4,123,991 | A | | 11/1978 | Kinrade |
| 4,150,505 | A | * | 4/1979 | Voelker ............................. 43/69 |
| D254,631 | S | | 4/1980 | Albright |
| 4,220,119 | A | | 9/1980 | Albright |
| D276,713 | S | | 12/1984 | Schacter |
| 4,557,395 | A | | 12/1985 | DeLay, Jr. |
| 4,644,902 | A | | 2/1987 | Doyle |
| D290,176 | S | | 6/1987 | Demeuse |
| D290,178 | S | | 6/1987 | Nissen |
| D294,985 | S | | 3/1988 | Blieden |
| 4,781,147 | A | | 11/1988 | Delino, Jr. |
| 4,803,951 | A | | 2/1989 | Davis |
| D302,610 | S | | 8/1989 | Slawinski |
| 4,852,520 | A | | 8/1989 | Goetz |
| D308,429 | S | | 6/1990 | VanSkiver |
| D308,588 | S | | 6/1990 | Goetz |
| 4,943,105 | A | | 7/1990 | Kacar et al. |
| 4,977,857 | A | | 12/1990 | Slawinski |
| 5,044,321 | A | | 9/1991 | Selph |
| 5,054,426 | A | | 10/1991 | Panarelli et al. |

(Continued)

OTHER PUBLICATIONS

International Search Report and Written Opinion (PCT/US2011/64208) dated Apr. 5, 2012.

(Continued)

*Primary Examiner* — Rob Swiatek
*Assistant Examiner* — Justin Benedik
(74) *Attorney, Agent, or Firm* — Clark & Elbing LLP; Todd Armstrong (57) ABSTRACT

The invention features an animal carrier that is designed to more easily place an animal (e.g., a cat or dog) into the carrier. The carrier features a funnel that can be attached to the body of the carrier, that is sized to permit passage of the animal through the funnel, that is oriented to convey the animal by gravity into the carrier, and that can be removed once the animal has been delivered into the carrier. The invention also features a retrofit funnel that is adapted to be securely attached to an opening of a standard animal carrier.

21 Claims, 9 Drawing Sheets

(56) References Cited

U.S. PATENT DOCUMENTS

| | | | |
|---|---|---|---|
| D322,695 S | 12/1991 | LaDue | |
| 5,090,368 A | 2/1992 | Berghoefer | |
| 5,092,270 A | 3/1992 | Simons et al. | |
| 5,113,793 A | 5/1992 | Leader et al. | |
| 5,116,219 A * | 5/1992 | Zimmerman | 43/139 |
| 5,133,294 A | 7/1992 | Reid | |
| D331,131 S | 11/1992 | Quillen | |
| 5,176,102 A | 1/1993 | Tracy | |
| D333,709 S | 3/1993 | Warren | |
| D334,087 S | 3/1993 | Goetz | |
| D334,253 S | 3/1993 | Balzarini | |
| 5,193,486 A | 3/1993 | Kitchens | |
| 5,253,612 A | 10/1993 | Goetz | |
| 5,280,767 A | 1/1994 | Goetz | |
| 5,305,710 A | 4/1994 | Ward, Jr. | |
| 5,485,805 A | 1/1996 | Meissner | |
| 5,486,167 A | 1/1996 | Dragoo et al. | |
| D367,733 S | 3/1996 | Paxman et al. | |
| 5,503,107 A | 4/1996 | Satcher et al. | |
| 5,509,915 A | 4/1996 | Hanson et al. | |
| D370,090 S | 5/1996 | Coggins | |
| D374,510 S | 10/1996 | Barreto, III et al. | |
| 5,577,646 A | 11/1996 | White | |
| D376,225 S | 12/1996 | Hauck | |
| D383,305 S | 9/1997 | Holstrom | |
| 5,669,331 A | 9/1997 | Richmond | |
| 5,671,698 A | 9/1997 | Farrugia | |
| 5,678,509 A | 10/1997 | Dillon | |
| D387,508 S | 12/1997 | Van Engers | |
| D387,510 S | 12/1997 | Way | |
| 5,715,772 A | 2/1998 | Kamrath et al. | |
| 5,718,191 A | 2/1998 | O'Donnell | |
| D394,747 S | 6/1998 | Cuypers | |
| 5,769,028 A | 6/1998 | Deckys | |
| 5,785,003 A | 7/1998 | Jacobson et al. | |
| 5,832,874 A | 11/1998 | Ravin | |
| 5,839,392 A | 11/1998 | Pemberton et al. | |
| 5,884,580 A | 3/1999 | Faircloth, Jr. | |
| 5,887,436 A | 3/1999 | Duddleston | |
| 5,894,817 A | 4/1999 | Manuel | |
| 5,901,664 A | 5/1999 | McKernan | |
| 5,913,120 A | 6/1999 | Cappelletti | |
| D412,223 S | 7/1999 | Medhurst | |
| D413,004 S | 8/1999 | Decarlo-Williams | |
| 5,931,120 A | 8/1999 | Burns et al. | |
| 5,941,195 A | 8/1999 | Martz | |
| 5,950,568 A | 9/1999 | Axelrod et al. | |
| 6,021,740 A | 2/2000 | Martz | |
| D423,147 S | 4/2000 | Farrugia | |
| D424,248 S | 5/2000 | Sommers | |
| 6,076,485 A | 6/2000 | Peeples et al. | |
| 6,082,305 A * | 7/2000 | Burns et al. | 119/497 |
| 6,095,090 A | 8/2000 | Burns et al. | |
| 6,102,444 A | 8/2000 | Kozey | |
| 6,131,534 A | 10/2000 | Axelrod | |
| 6,138,853 A | 10/2000 | Frechette | |
| 6,179,183 B1 | 1/2001 | Kloster | |
| 6,189,490 B1 | 2/2001 | Jempolsky | |
| 6,196,161 B1 | 3/2001 | Thurber | |
| 6,216,637 B1 * | 4/2001 | Burns et al. | 119/497 |
| 6,216,638 B1 | 4/2001 | Pivonka et al. | |
| D442,748 S | 5/2001 | Farrugia | |
| 6,230,656 B1 | 5/2001 | Walach | |
| D443,958 S | 6/2001 | Chrisco et al. | |
| D444,271 S | 6/2001 | Farrugia | |
| D445,222 S | 7/2001 | Ross | |
| D445,965 S | 7/2001 | Licciardello | |
| D445,966 S | 7/2001 | Licciardello | |
| 6,267,080 B1 | 7/2001 | Roy | |
| 6,286,461 B1 | 9/2001 | Martz | |
| 6,286,462 B1 | 9/2001 | Burns | |
| 6,302,061 B1 | 10/2001 | Weatherby et al. | |
| 6,308,661 B2 | 10/2001 | Burns et al. | |
| D451,646 S | 12/2001 | Lerner | |
| D451,647 S | 12/2001 | Chrisco et al. | |
| D453,592 S | 2/2002 | Ross | |
| D453,593 S | 2/2002 | Licciardello | |
| 6,345,591 B1 | 2/2002 | Richmond | |
| 6,394,036 B2 | 5/2002 | Burns et al. | |
| 6,397,907 B1 * | 6/2002 | Heintz | 141/338 |
| 6,408,797 B2 | 6/2002 | Pivonka et al. | |
| 6,425,349 B1 | 7/2002 | Laskin et al. | |
| 6,427,631 B1 | 8/2002 | Ross | |
| 6,470,829 B1 | 10/2002 | Spangler et al. | |
| 6,479,415 B1 | 11/2002 | Erspamer et al. | |
| 6,484,672 B1 | 11/2002 | Versaw | |
| D469,929 S | 2/2003 | Licciardello | |
| 6,516,751 B2 * | 2/2003 | Burns et al. | 119/497 |
| 6,523,499 B1 | 2/2003 | Chrisco et al. | |
| 6,539,895 B2 | 4/2003 | Hoagland | |
| 6,561,129 B1 | 5/2003 | Cheng | |
| D475,660 S | 6/2003 | Licciardello | |
| 6,637,149 B1 * | 10/2003 | Bauer | 43/107 |
| 6,647,925 B1 | 11/2003 | Waiters | |
| 6,701,871 B1 | 3/2004 | Johnson | |
| 6,786,181 B1 | 9/2004 | Leanheart | |
| 6,802,282 B2 | 10/2004 | Muckleroy | |
| D499,514 S | 12/2004 | Doan | |
| 6,841,244 B2 | 1/2005 | Foss et al. | |
| 6,863,030 B2 | 3/2005 | Axelrod | |
| 6,866,009 B2 | 3/2005 | Smith, Jr. et al. | |
| 6,899,057 B1 | 5/2005 | Chrisco et al. | |
| 7,021,242 B2 | 4/2006 | Axelrod | |
| 7,025,019 B2 | 4/2006 | Axelrod et al. | |
| D520,190 S | 5/2006 | Joyner | |
| 7,036,458 B1 | 5/2006 | Stornant | |
| D523,995 S | 6/2006 | Knittle | |
| D524,995 S | 7/2006 | Dudas | |
| D524,996 S | 7/2006 | Delino | |
| D528,706 S | 9/2006 | Jefferson | |
| 7,152,554 B2 | 12/2006 | Crawford | |
| D539,486 S | 3/2007 | Williams | |
| D539,509 S | 4/2007 | Fugazzi | |
| 7,207,141 B2 | 4/2007 | Sullivan | |
| 7,210,426 B2 | 5/2007 | Yeung | |
| 7,261,060 B1 | 8/2007 | Garofola et al. | |
| D555,293 S | 11/2007 | Gourkow | |
| 7,296,303 B1 | 11/2007 | Samet | |
| D558,406 S | 12/2007 | King | |
| 7,318,392 B2 | 1/2008 | Rosen et al. | |
| D565,254 S | 3/2008 | Modi et al. | |
| D569,049 S | 5/2008 | Lin | |
| D570,556 S | 6/2008 | Richardson | |
| D571,053 S | 6/2008 | Donnelly | |
| D571,054 S | 6/2008 | Donnelly | |
| 7,380,518 B2 | 6/2008 | Kates | |
| 7,387,083 B2 | 6/2008 | Nardine, III et al. | |
| D574,559 S | 8/2008 | You et al. | |
| D575,461 S | 8/2008 | Cannon et al. | |
| 7,438,021 B2 | 10/2008 | Dietrich | |
| 7,438,022 B2 | 10/2008 | Mirsky | |
| 7,438,199 B1 * | 10/2008 | Tidrick | 220/495.04 |
| 7,455,032 B2 | 11/2008 | Axelrod | |
| D583,108 S | 12/2008 | Richardson | |
| D584,458 S | 1/2009 | You et al. | |
| 7,523,719 B2 | 4/2009 | Miller et al. | |
| 7,568,450 B2 | 8/2009 | Chen | |
| 7,578,264 B2 | 8/2009 | Guard | |
| 7,617,800 B2 | 11/2009 | Trescott | |
| 7,624,705 B2 | 12/2009 | Plante | |
| 7,628,120 B2 | 12/2009 | Beeler | |
| 7,655,829 B2 | 2/2010 | MacDonald et al. | |
| 7,665,421 B2 | 2/2010 | Martz | |
| 7,678,221 B2 | 3/2010 | Takahashi et al. | |
| 7,681,532 B1 | 3/2010 | Deane | |
| 7,699,348 B2 | 4/2010 | Singh | |
| D616,158 S | 5/2010 | Lu | |
| D616,611 S | 5/2010 | Lu | |
| D616,612 S | 5/2010 | Lu | |
| D616,613 S | 5/2010 | Lu | |
| 7,707,972 B2 | 5/2010 | Mirsky | |
| 7,712,437 B2 | 5/2010 | Leung | |
| 7,721,678 B2 | 5/2010 | Jakubowski et al. | |
| 7,730,740 B2 | 6/2010 | Keller | |

(56) References Cited

U.S. PATENT DOCUMENTS

| | | |
|---|---|---|
| D619,307 S | 7/2010 | Martin |
| D621,101 S | 8/2010 | Hu |
| 7,765,954 B2 | 8/2010 | Plante |
| 7,789,044 B2 | 9/2010 | McGrade |
| 2002/0124808 A1* | 9/2002 | Zampelli et al. ............... 119/497 |
| 2006/0169212 A1* | 8/2006 | Nock .......................... 119/51.01 |
| 2009/0205578 A1* | 8/2009 | Alves ............................. 119/454 |
| 2009/0223116 A1 | 9/2009 | Meghji et al. |

OTHER PUBLICATIONS

International Preliminary Report on Patentability and Written Opinion of the International Searching Authority for International Application No. PCT/US2011/064208, dated Jun. 12, 2013 (6 pages).

* cited by examiner

EASY TO INSERT PET CARRIER

FIELD OF THE INVENTION

The invention is directed toward an improved animal carrier of the type utilized for transporting small animals, particularly cats and dogs. The carrier is adapted to receive a detachable funnel that provides safe and quick entry of the animal into the carrier while simultaneously reducing the hassle experienced by the person handling the animal during loading into the carrier. The invention also features a retrofit funnel adapted for use with traditional pet carriers.

BACKGROUND OF THE INVENTION

Several animal carriers for transporting pets have been previously described (see, e.g., U.S. Pat. Nos. 4,852,520; 5,253,612; 6,427,631; and 6,539,895). Such carriers currently come in a variety of shapes, styles, and sizes. For many of these carriers, placing the animal inside can be awkward, if not difficult, for the person handling the animal, and attempts to place the animal into the carrier often results in injury or stress to either the handler or the animal. Thus, there exists a need for an animal carrier having an improved design that makes it easier to place the animal into the carrier.

SUMMARY OF THE INVENTION

The invention features an animal carrier that is designed to place an animal more easily (for example, including, but not limited to, a cat, dog, rat, ferret, guinea pig, chinchilla, rabbit, chicken, raccoon, possum, or skunk) into the carrier. In addition, the animal carrier of the invention is designed to reduce the anxiety most animals experience when being placed into a carrier. The animal carrier of the invention also improves the safety of both the animal and the person handling the animal during loading into the carrier. In addition, the carrier is designed to decrease human frustration by providing multiple safe and efficient methods for loading the animal into the carrier.

A first aspect of the invention features an animal carrier having a) a body defining a housing for an animal, the body having a substantially planar bottom portion connected to a substantially planar top portion by two side walls, a back wall, and a front wall, each of which are affixed at the periphery of said top and bottom portions and in a substantially perpendicular orientation thereto, in which the top portion or the back wall has a first opening that is sized and shaped to permit movement of the animal into the carrier, and b) a funnel having a first open end in fluid communication with a second open end through a neck portion (e.g., a tapering neck portion (e.g., in the shape of a tapering cone or cylinder, a tapering square, or a tapering trapezoid or other shape)), the first open end being larger in diameter than the second open end, the second open end being adapted for attachment to the first opening of the body, and the funnel being sized to permit passage of the animal through the funnel and being oriented to convey the animal by gravity into the carrier.

In an embodiment, the animal is a small animal, such as a cat or dog. In other embodiments, the animal weighs less than about 30 pounds/14 kilograms (e.g., the animal has a weight in the range of about 2 pounds/1 kilogram to about 20 pounds/9 kilograms).

In several embodiments, the first opening of the body is in the top portion, the back wall, or the front wall. In other embodiments, the carrier further includes a second opening in the front wall that is sized and shaped to permit movement of the animal into and out of the carrier, the second opening having a gate that is pivotally mounted in the second opening and that is capable of moving between an open and a closed configuration, the gate further having a latch for retaining the gate in a closed position and the front wall having a locking pin adapted to engage the latch to retain the gate in the closed position. In still other embodiments, the carrier includes a handle affixed to an exterior of the top portion, the sides, or the front or back wall; one or more wall protectors affixed to an exterior of the carrier (e.g., one or more wall protectors affixed to the front wall, the back wall or the sides); or one or more non-skid feet affixed to an exterior of the bottom portion of the carrier.

In further embodiments, the carrier includes a substantially planar raised floor portion that is positioned above the bottom portion and that defines a space between the raised floor portion and the bottom portion. Preferably, the raised floor portion is removable from the carrier or includes a plurality of holes or slits. In other embodiments, the carrier further includes an access panel on at least one of the side walls, the front wall, or the back wall that is sized and shaped to provide access into the space between the raised floor portion and the bottom portion. For example, the space between the raised floor portion and the bottom portion is between 0.5 and 3.0 inches in height along substantially the entire length of the carrier from back to front. In still other embodiments, the carrier further includes an absorbent pad that is configured to fit within the space between the raised floor portion and the bottom portion.

In other embodiments, the carrier further includes an insertion point at or near the bottom of the carrier that is sized and shaped to accommodate a human foot so that pressure can be applied to the insertion point to stabilize the carrier during insertion of an animal into the carrier. In several embodiments, the insertion point is a recessed area or a substantially planar ledge on one or more of the side walls, the back wall, or the front wall.

The carrier can also include one or more accessories. For example, a liquid or solid dispensing device that is detachably fastened to an exterior portion of the carrier and that includes a spout that extends into an interior portion of the carrier for delivering a liquid or solid to the interior portion of the carrier. The carrier can also include one or more diffusers that are detachably fastened to an interior or exterior portion of the carrier, in which the diffuser has a mechanism for releasing a pheromone or aroma in the form of a spray, a mist, an aerosol, or a slow release matrix into an interior portion of the carrier (e.g., the diffuser may release the pheromone or aroma by the application of heat or by evaporation without the application of heat).

A second aspect of the invention features a funnel that is adapted for use with an animal carrier that includes a first open end in fluid communication with an opposite second open end through a neck portion, the first open end being larger in diameter than the second open end, the second open end including a connection harness or ring for attaching the funnel to an opening of the carrier, the funnel being sized to permit passage of an animal through the funnel. The connection harness or ring may be an integral component of the funnel or it may be a separate piece of hardware that can be fastened to the funnel or used to fasten the funnel to the carrier. The funnel may also be adapted to be securely fastened to a carrier with or without additional hardware (e.g., with or without one or more connectors, such as a clamp or coupling). In an embodiment, the connection harness or ring includes one or more (e.g., two to four or more) connectors, such clamps or couplings, that can be used to fasten the funnel to the carrier. In another embodiment, the funnel is telescoping or can be retrofitted to an existing animal carrier.

Other features and advantages of the invention will be apparent from the following Detailed Description, the Drawings, and the Claims.

DETAILED DESCRIPTION

The animal carrier of the invention is designed with a number of improvements relative to traditional animal carriers. In particular, the animal carrier of the invention features a detachable funnel that provides safe and quick entry of the animal (e.g., a cat, dog, rat, ferret, guinea pig, chinchilla, rabbit, or chicken) into the carrier while simultaneously reducing the hassle experienced by the person handling the animal during loading into the carrier. The funnel provides open communication to the interior of the carrier and has an opening (the entry point) and an exit (the attachment point) that is larger than the animal; the opening is larger in diameter than the exit. The funnel is obstacle free and has a smooth interior into which the animal fits easily. By "smooth" is meant that there are no significant ridges, grooves, ledges or seams in the interior and/or outer edge of the funnel that an animal could use to gain traction, e.g., by using their claws, and thereby avoid sliding into the carrier. The interior of the funnel, or one or more of its ends, may have a substantially rounded, square, hexagonal, or elliptical shape.

Once inside the opening of the funnel, gravity will propel the animal safely into the carrier, as there is nothing the animal can grip or use for leverage to resist sliding into the carrier as a result of the smooth interior. Once the animal is inside the carrier, the funnel may be detached or otherwise stored easily and the opening into the carrier sealed in one or more of the ways described herein.

In an embodiment, the carrier is sized and shaped to hold a small animal. In other embodiments, the small animal is a cat or dog.

Structure of an Exemplary Funnel of the Invention

Figure 1:
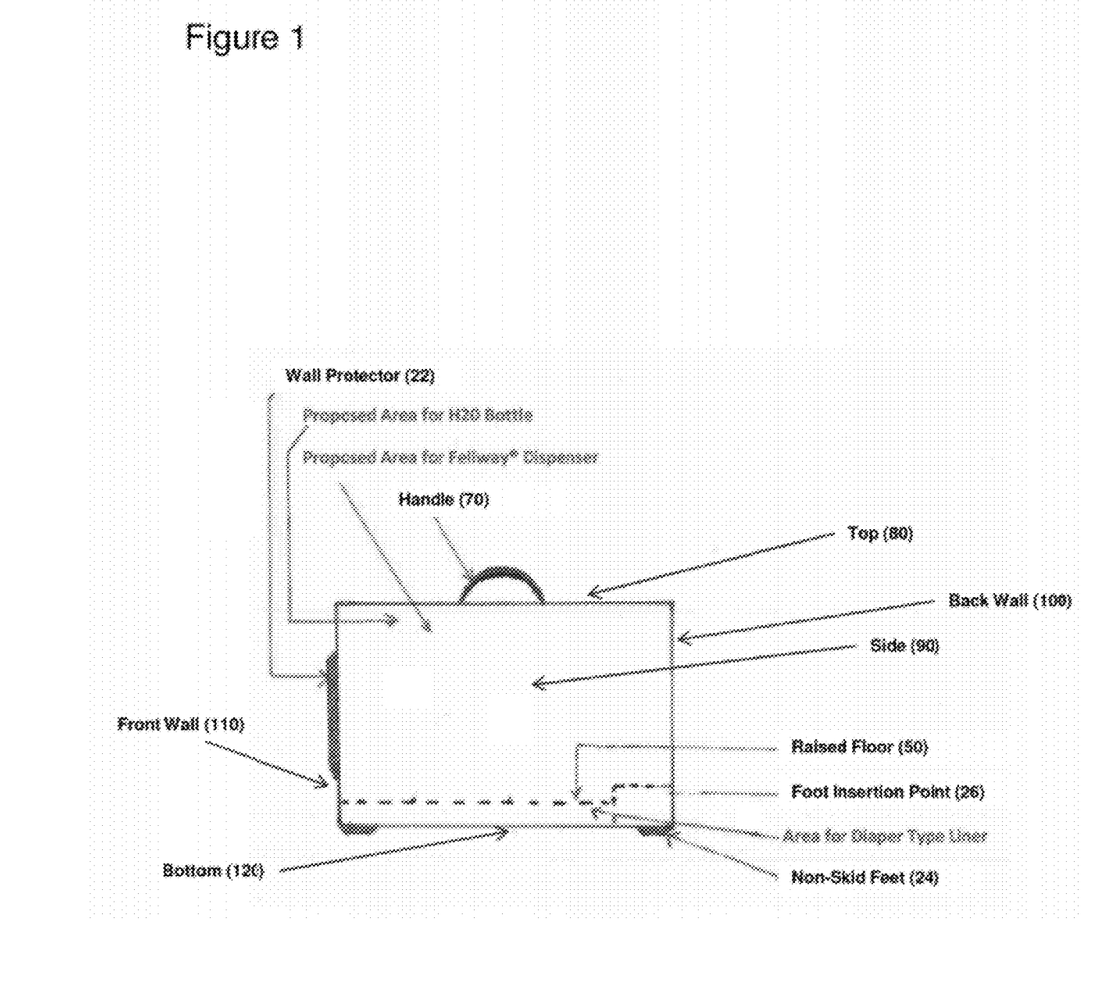
FIG. 1 is a side view of a carrier of the invention.
Figure 2:
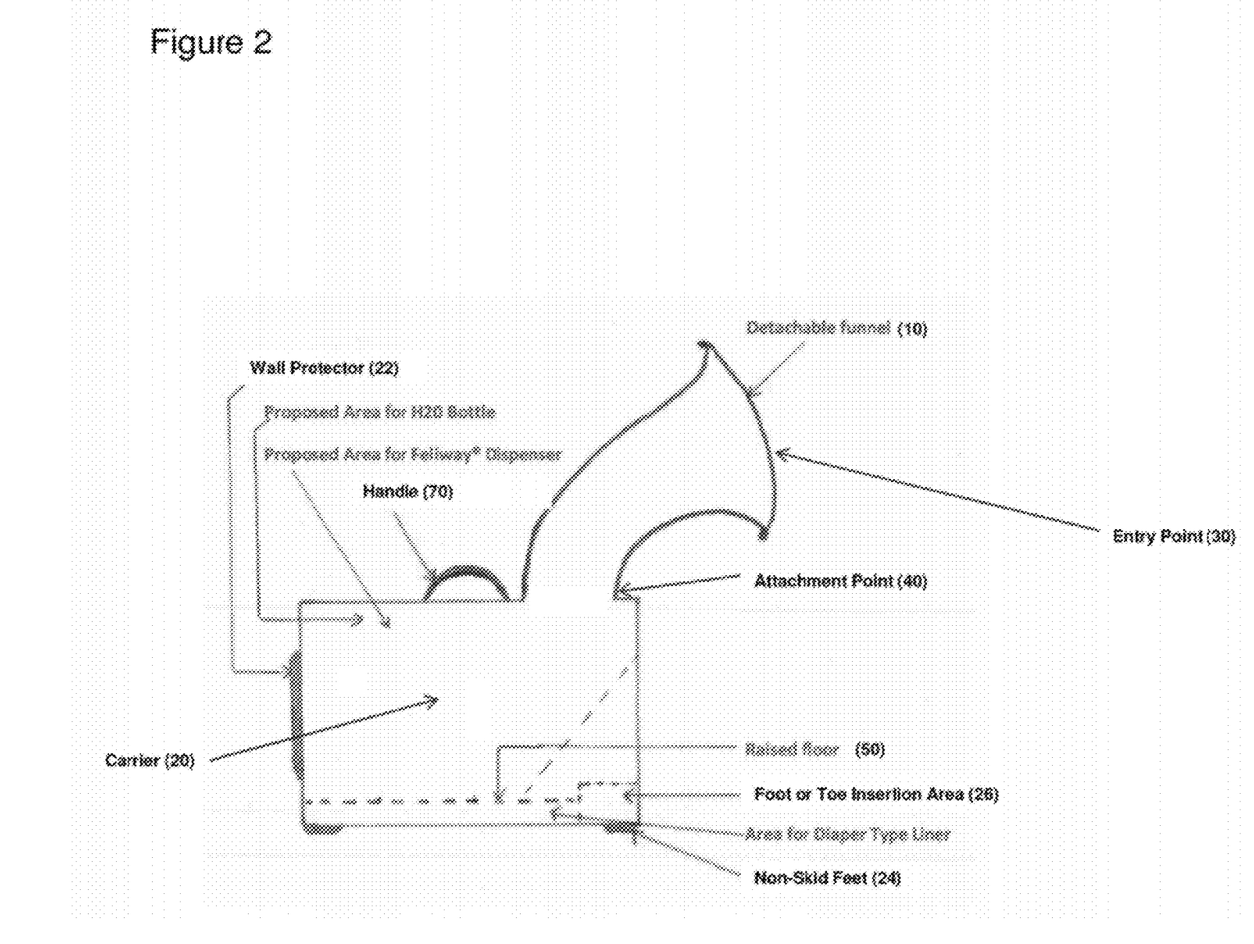
FIG. 2 is a side view of a carrier of the invention showing an embodiment of the funnel attached to the top of the carrier.
Figure 3:
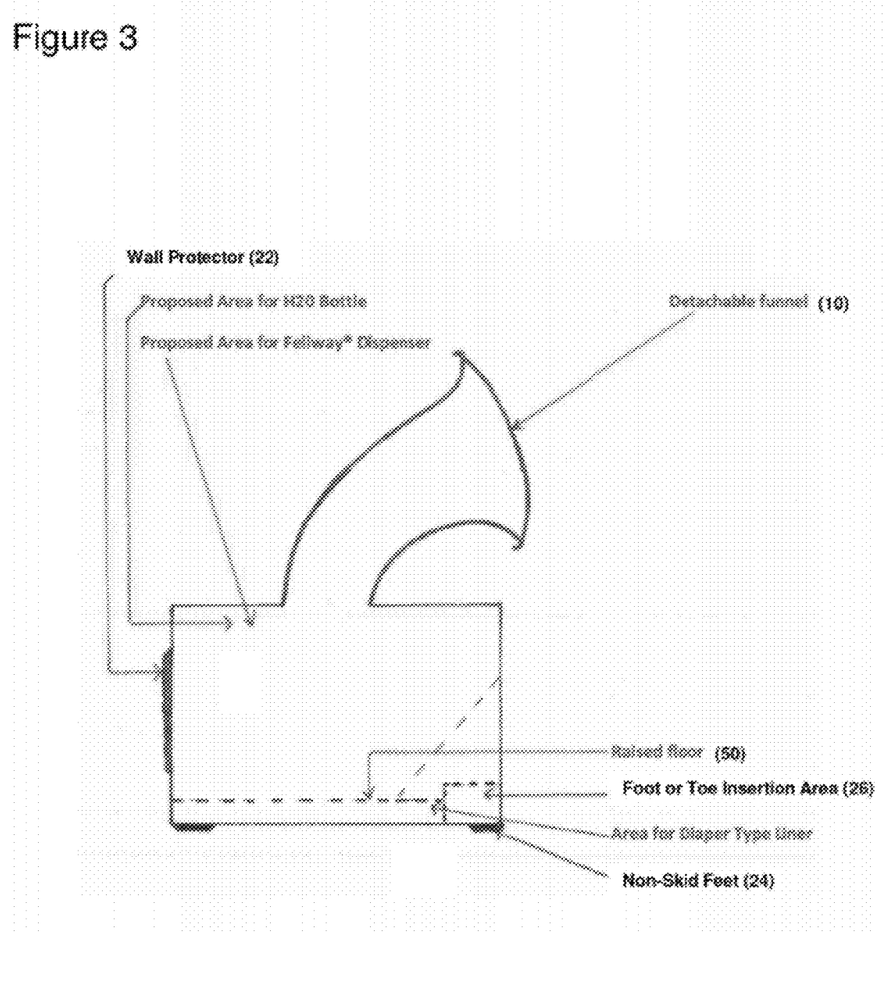
FIG. 3 is a side view of another embodiment of the carrier of the invention showing the funnel attachment in place of the handle. The funnel can be removed from the carrier once the animal is placed inside and replaced with an insert that includes a handle.
Figure 4:
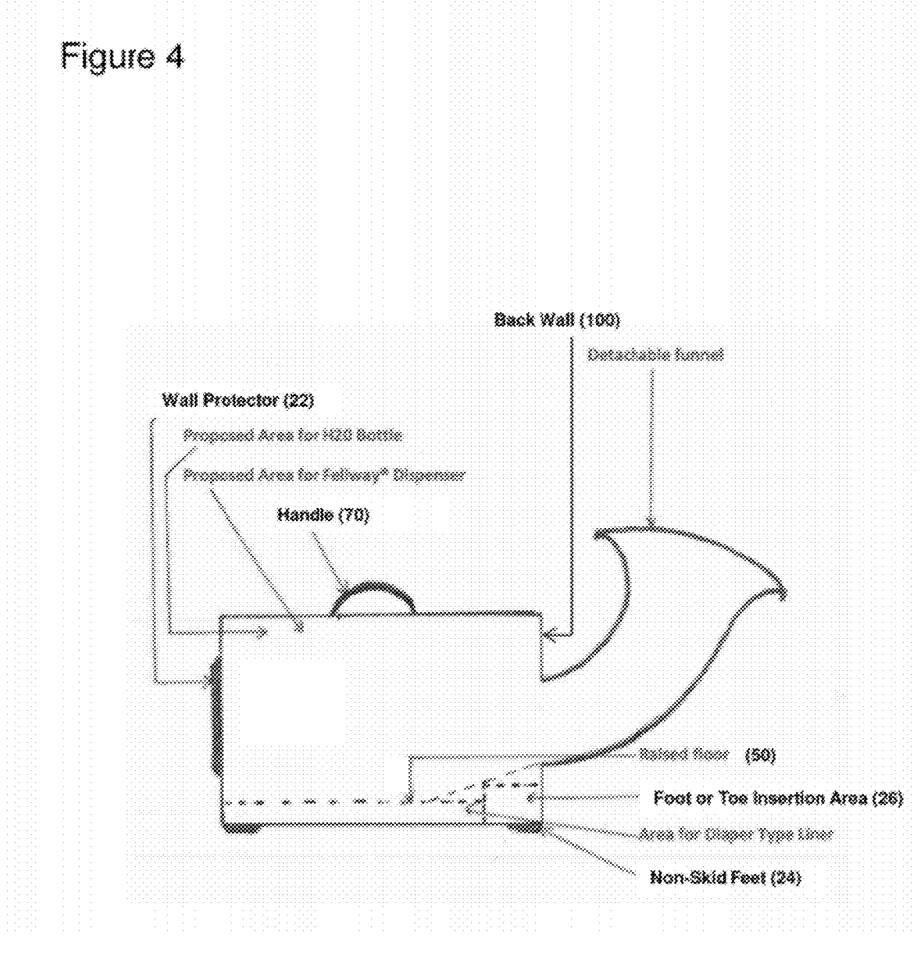
FIG. 4 is a side view of another embodiment of the carrier of the invention showing the funnel attached to the back wall (100).
Figure 5:
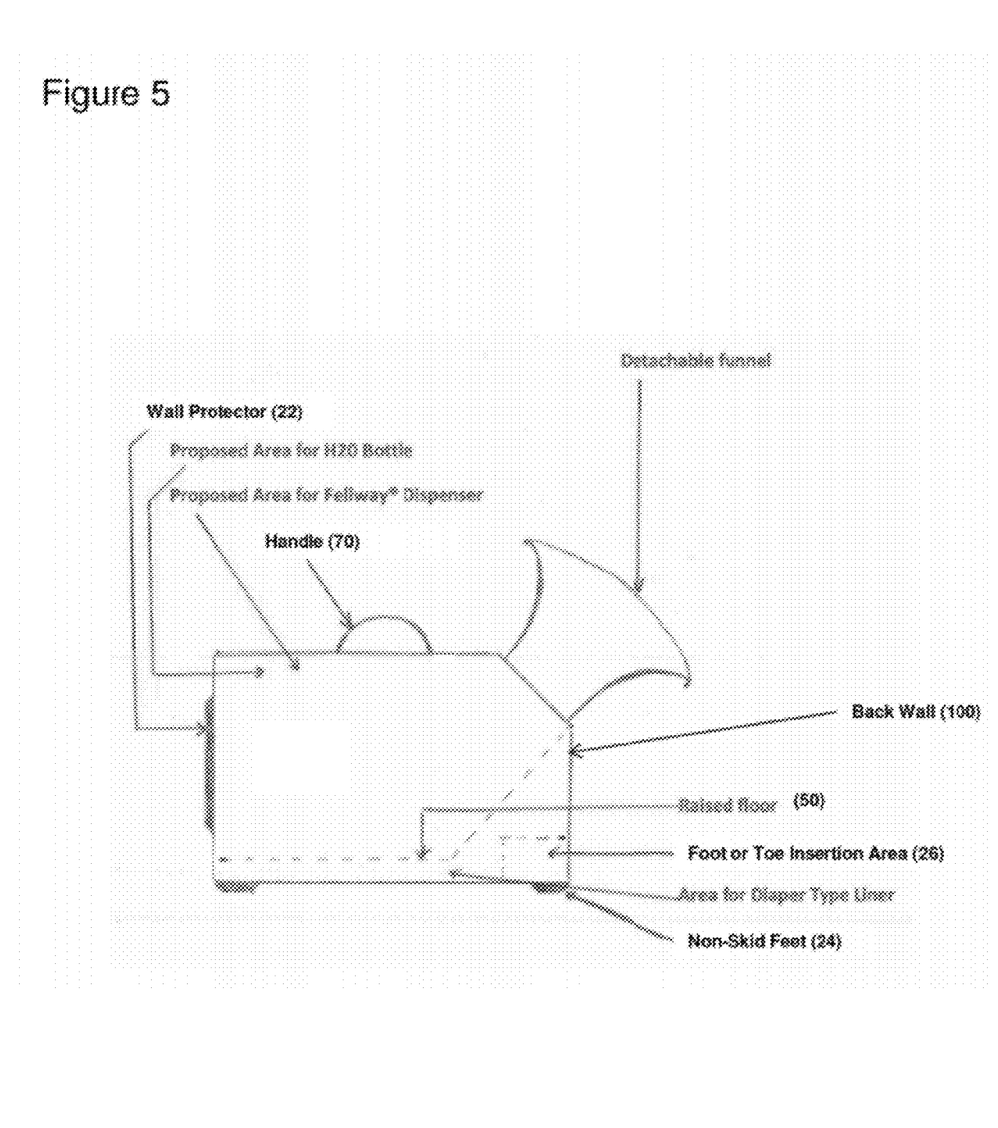
FIG. 5 is a side view of another embodiment of the carrier of the invention, in which a portion of the back wall (100) is angled and is adapted to receive the funnel attachment in that region.
Figure 6:
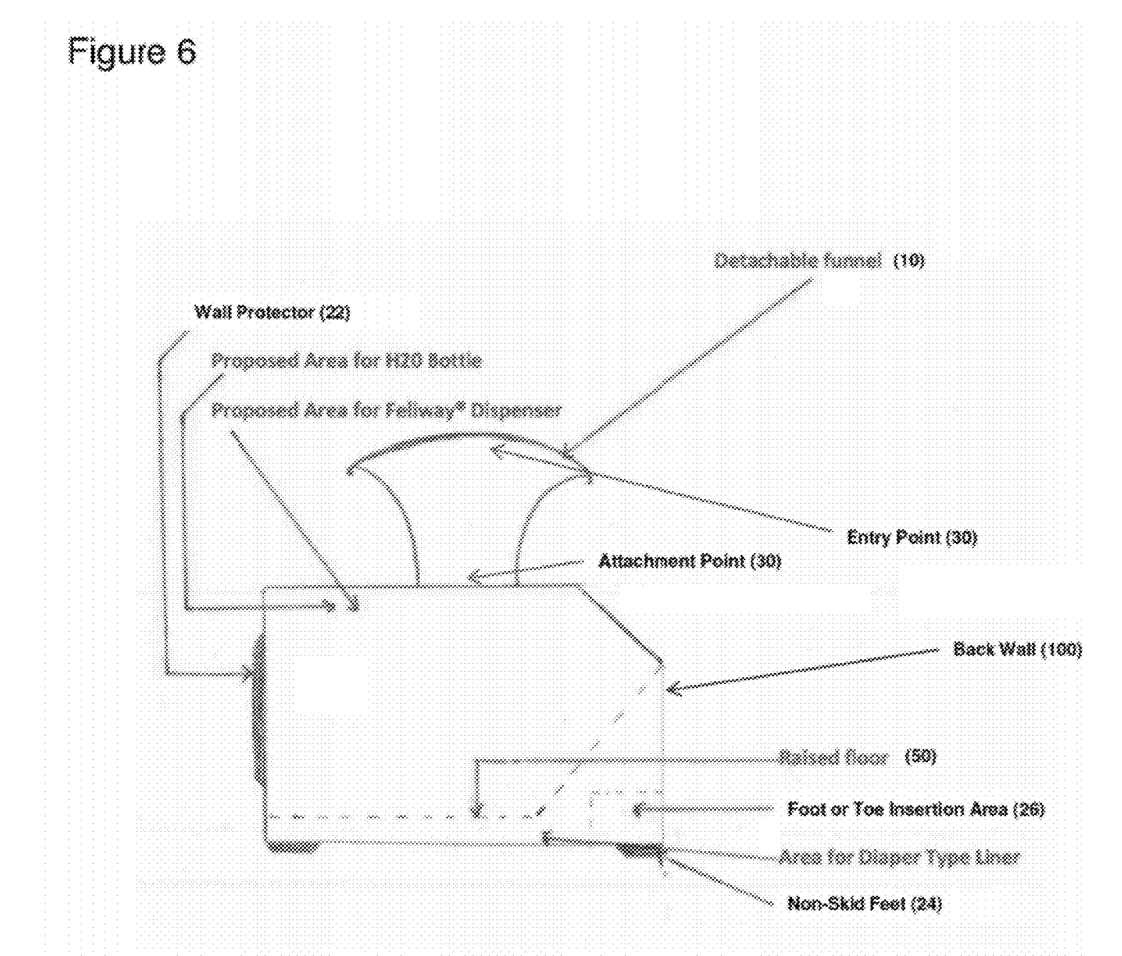
FIG. 6 is a side view of another embodiment of the carrier, in which a portion of the back wall (100) is angled and the funnel is attached to the carrier in place of the handle.
Figure 7:
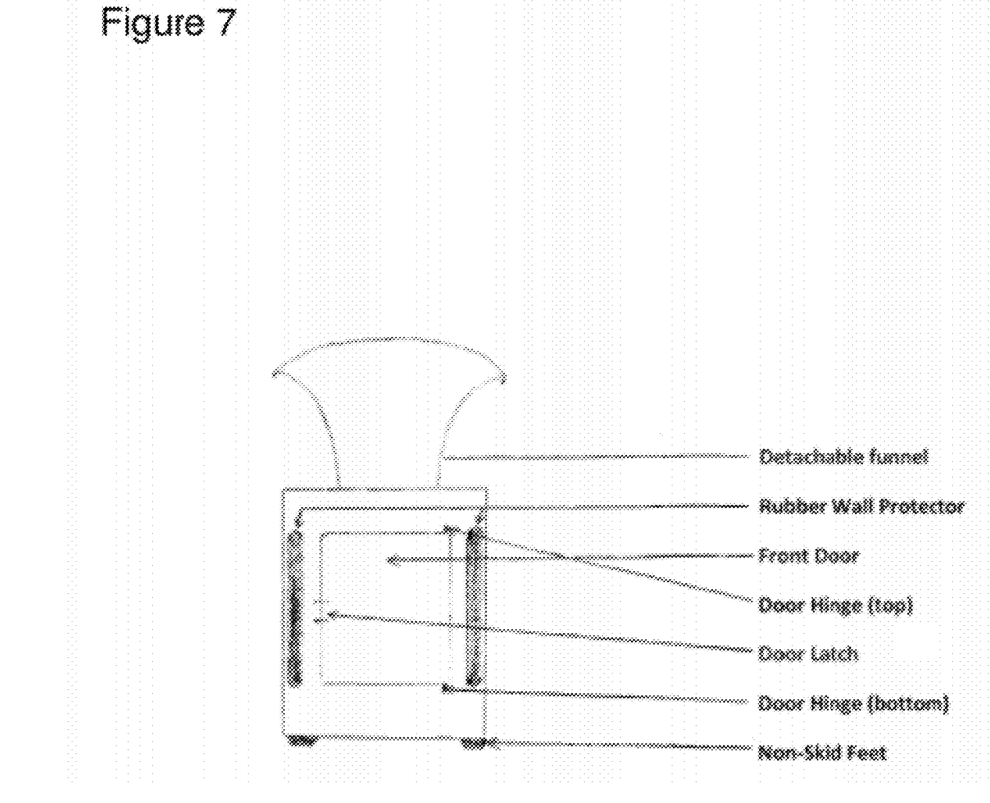
FIG. 7 is a front view of another embodiment of the carrier of the invention, which shows a front door and a funnel attached to the top of the carrier.

Attachable/detachable funnel (10) is sized to be about five (5) to about thirty (30) inches (e.g., about twenty (20) inches) in length end to end. As used herein, the term "about" means±10% of the recited value. The diameter of the funnel decreases in size from entry point (30) to attachment point (40) (see, e.g., FIG. 2). The decrease in diameter of funnel (10) may be uniform from end to end or the decrease in diameter may be greater nearer entry point (30) or attachment point (40). In an embodiment, the diameter of funnel (10) at attachment point (40) is less than the diameter of funnel (10) at entry point (30). For example, the diameter of attachment point (40) can be about five (5) to about twenty (20) inches (e.g., about ten (10) inches), while the diameter of entry point (30) can be about ten (10) to about thirty (30) (e.g., about sixteen (16) inches) in diameter. In an embodiment, the diameter of funnel (10) at entry point (30) is greater than or equal to the width of the rear leg splay of an average size animal (e.g., a cat, dog, rat, ferret, guinea pig, chinchilla, rabbit, and chicken); e.g., in the range of about 10 to about 30 inches.

In other embodiments, funnel (10) is made of molded plastic (e.g., rigid or semi-rigid plastic). In yet other embodiments, funnel (10) has a texture or coating that is resistant to claw scratching. Desirably, funnel (10) has a color that is calming to an animal. In other embodiments, funnel (10) and carrier (20) are the same or different colors.

In still other embodiments, the interior wall of funnel (10) is substantially smooth, such that it prevents the animal from using its claws to grip or hang onto the walls to avoid falling by gravity into carrier (20).

Funnel (10) may be sized and shaped so that it can be stored easily inside carrier (20) when not occupied by an animal. Alternatively, funnel (10) may be larger than the interior space of carrier (20), and thus may need to be stored outside carrier (20).

In yet other embodiments, funnel (10) may also be a telescoping funnel that can be extended to an elongated open position and collapsed to a substantially flat closed position. Carrier (20) may also be designed to include a storage slot for storing the telescoping funnel in its closed position after it has been detached from carrier (20). In another embodiment, the telescoping funnel can be locked in its open position to prevent collapse during use. An example of a general design for a telescoping funnel can be found in, e.g., U.S. Pat. No. 6,397,907.

In still other embodiments, funnel (10) may be adapted for use with traditional animal carriers (e.g., those described in U.S. Pat. Nos. 4,852,520; 6,427,631; 6,523,499; and 6,539,895, each of which is incorporated herein by reference, as well as the TRAVEL-ARE Pet Carriers (e.g., the KENNEL-ARE Pet Carrier) and PETMATE pet carriers (e.g., the Deluxe Vari Kennel; the Double Door Deluxe; and the Pet Shuttle)). Non-limiting examples of these embodiments of the invention are shown in, e.g., FIGS. 8 and 9.

Figure 8:
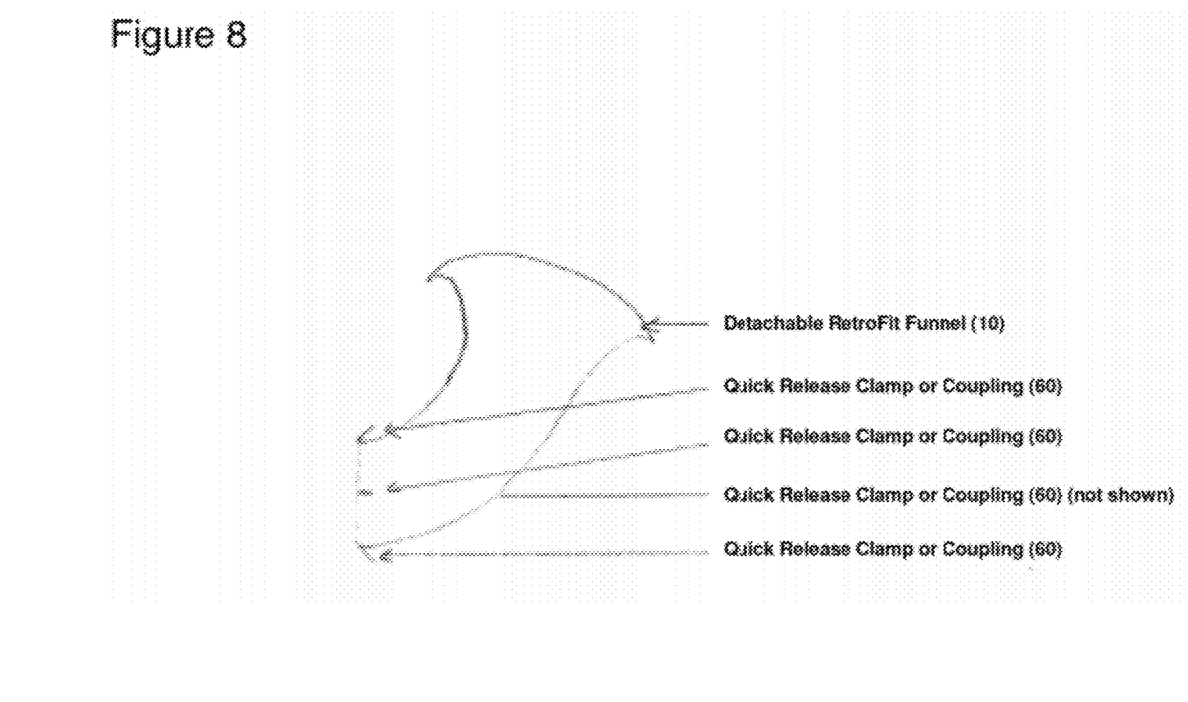
FIG. 8 is a side view of a retrofit funnel of the invention.
Figure 9:
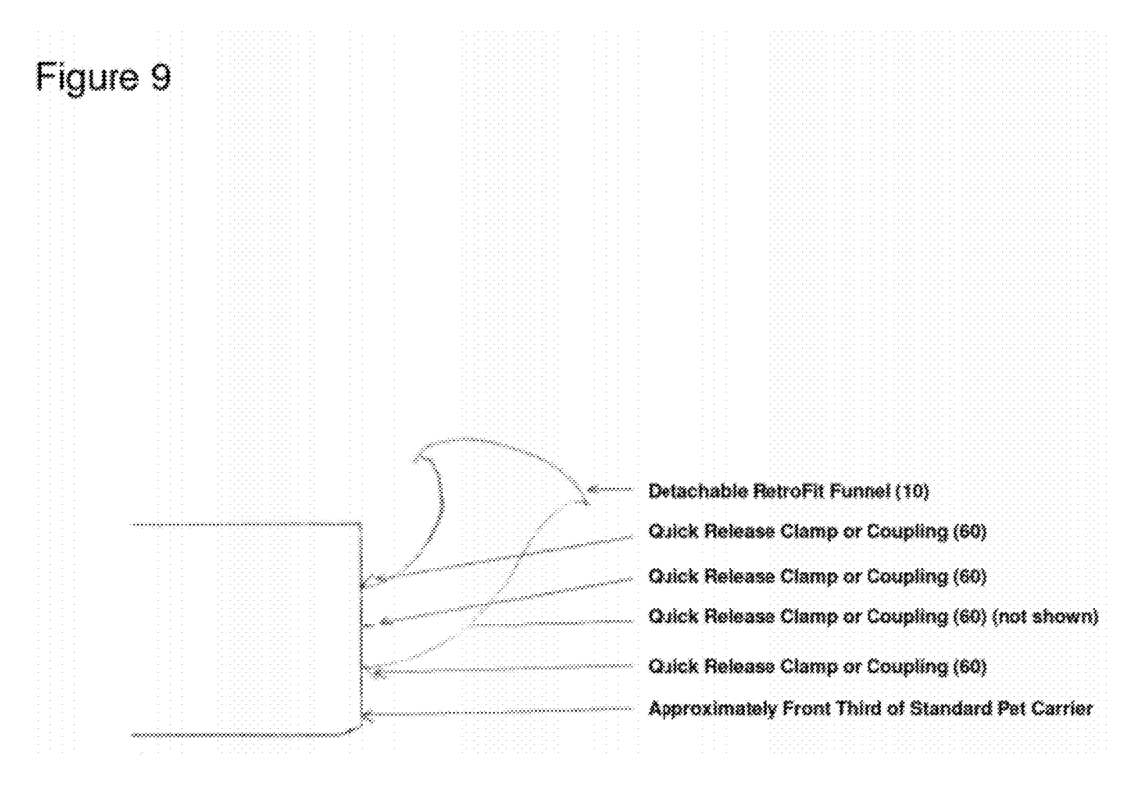
FIG. 9 is a side view of a retrofit funnel of the invention attached to a prior art known animal carrier.

For example, funnel (10) can be retrofitted to include one or more quick release connectors, clamps, or couplings (60) (e.g., about 1 to 8 clamps or couplings) at its attachment point that allow it to be fitted and securely attached to an opening, such as a door, of a traditional or art known animal carrier. The same materials and overall dimensions for funnel (10) described herein will apply to the retrofit funnel. The difference will be the mounting of the funnel. The end of the retrofit funnel that attaches to the animal carrier can include one or more quick release connectors, clamps, or couplings (60) (e.g., two, four, six, or eight clamps or couplings, such as those described herein) that allow retrofit funnel (10) to be attached tightly and securely to the front of most standard animal carriers when their door is in the open position or is removed from the animal carrier. In an embodiment, the connector(s), clamp(s), or coupling(s) (60) are made from stainless steel. Alternative materials, such as plastics or other types of metal can also be used for the connector(s), clamp(s), or coupling(s). In an embodiment, the end of the retrofit funnel that attaches to the animal carrier may transition from a rounded, larger, outer end at the entry point to a substantially square or rectangular end at the attachment point to accommodate a secure fit to the opening of the animal carrier and the placement of one or more of the, connectors, clamps, and couplings. Although the retrofit funnel can vary in its size and shape at the attachment point, preferably the attachment point of the retrofit funnel is sized and shaped to follow the contours of the opening(s) in most animal carriers.

Description and Dimensions of Carrier

Animal carrier (20) may have the dimensions of a traditional animal carrier, such as those described in U.S. Pat. Nos. 4,852,520; 6,427,631; 6,523,499; and 6,539,895; each of which is incorporated herein by reference. In an embodiment, the animal carrier has dimensions of about 10 to about 30 inches in length, about 8 to about 20 inches in height, and about 8 to about 20 inches wide. For example, carrier (20) may have dimensions of about 18"×10"×12" (L×H×W). The animal carrier may also be slightly larger with dimensions of about 20"×12"×14" (L×H×W).

FIGS. 1-7 show exemplary embodiments of animal carrier (20) according to the present invention. As shown, animal carrier (20) includes a bottom (120), a top (80), opposed sides (90), a back wall (100), a front wall (110), and one or more door or entry points, which together define carrier (20). Preferably, carrier (20) is generally rectangular in shape, but other shapes and sizes for the carrier are also envisioned. For example, carrier (20) may also be round, elliptical, square, hexagonal, octagonal, or trapezoidal.

In other embodiments, carrier (20) can include an additional, optional, funnel-less entry point. For example, the front, side(s), or back of carrier (20) can have a door (e.g., a hinged door with a latch) through which a handler can place or release the animal.

In other embodiments, carrier (20) includes two or more separate entry points: one on the top of carrier (20) and one in front wall (110), back wall (100), or side(s) (90) of carrier (20). One or more of these entry points may be shaped and sized to engage funnel (10), thereby providing the person handling the animal with the choice to slide the animal in head first or airlift the animal in rear feet first using either of these entry points.

Carrier (20) can also be configured so that funnel (10) can be connected to an opening in the top (80), the side(s) (90), or the front wall (110) of carrier (20). In addition, any of these entry points, besides being configured for use with funnel (10), may optionally have a hinged door with a latch through which a handler can place or release the animal without use of funnel (10).

Carrier (20) of the invention can also include one or more features that are designed to provide traction and stability to carrier (20) when in use. For example, carrier (20) can include one or more of the following: 1) one or more wall protectors (22) (e.g., a rubber wall protector) placed on one or more sides or the front or back wall of carrier (20); 2) one or more non-skid feet (24) on the bottom of carrier (20) (e.g., non-skid rubber feet)) that prevent or reduce the amount of sliding of carrier (20) during use (e.g., when attempting to place the animal in, or remove the animal from, carrier (20)); and 3) foot insertion point (26).

Carrier (20) can include one or more wall protectors (22) (e.g., 2, 3, 4, 5, or 10 wall protectors) on one or more the sides (e.g., on front wall (110), back wall (100), or side(s) (90)) that allow carrier (20) to be placed against a wall without leaving a mark or that provide a handler with the ability to prevent carrier (20) from sliding during use (e.g., when attempting to place an animal in, or remove an animal from, carrier (20)). Wall protector(s) (22) can be placed on the side of carrier (20) that is opposite from funnel (10) (e.g., when funnel (10) is engaged to carrier (20) on the back side, front wall (110) can have one or more wall protector(s) (22). In other embodiments, both sides (90) of carrier (20) have wall protector(s) (22). In still other embodiments, both sides (90) and front wall (110) of carrier (20) have one or more wall protector(s) (22). In yet other embodiments, the sides (90) and back wall (100) of carrier (20) have one or more wall protector(s) (22).

Carrier (20) may also include one or more non-skid feet (24) (e.g., rubber feet) that are designed to grip the floor and prevent or reduce sliding of carrier (20) during insertion and removal of the animal from carrier (20). For example, carrier (20) can have 2, 3, 4, 5, 6, 7, 8, 9, or 10 non-skid feet. In an embodiment, the non-skid feet are arranged symmetrically or are evenly spaced along bottom (120).

In an embodiment, wall protector(s) (22) and non-skid feet (24) of carrier (20) may be made from a rubber or rubber-like material (e.g., ethylene propylene diene monomer (EPDM), natural rubber, neoprene, polyisoprene, nitrile, styrene-butadiene rubber (SBR), silicone, sponge rubber, fluoroelastomers (e.g., copolymers of hexafluoropropylene (HFP) and vinylidene fluoride (VDF or VF2), terpolymers of tetrafluoroethylene (TFE), vinylidene fluoride (VDF) and hexafluoropropylene (HFP), and perfluoromethylvinylether (PMVE); e.g., Viton®) ebonite, and urethane).

Carrier (20) can also be designed to include foot or toe insertion point (26). Insertion point (26) can be molded into the design of carrier (20) (e.g., as a recessed area or as a substantially planar ledge) or it can be an extra component (e.g., a substantially planar ledge) that can be attached to the exterior of carrier (20) (e.g., at or near the bottom of one or more of the sides (90), the front wall (110), or the back wall (100)) during insertion and removal of the animal and removed (or, if attached by a hinge(s), flipped up to a closed position right up against the exterior wall) from carrier (20) while the animal is in transit in carrier (20). Insertion point (26) allows the human handling the animal to apply pressure on carrier (20) with his/her foot to prevent movement of carrier (20). In an embodiment, insertion point (26) is present at the base of carrier (20) (see FIGS. 1-6). In other embodiments, insertion point (26) is placed on the side (90) of carrier (20), e.g., on the side nearest funnel (10). For example, insertion point (26) can be present at the back wall (100) of carrier (20) adjacent to funnel (10).

Carrier (20) can also include one or more slits or holes in one or more of the sides (e.g., front wall (110), back wall (100), or side(s) (90)), or the top (80), of carrier (20) to allow for air circulation, feeding of the animal, or insertion of a feeding or water tube.

In another embodiment, the interior of carrier (20) has raised floor (50) with a defined space between the raised floor in the interior of the carrier and the interior bottom of the carrier. The space created between raised floor (50) and the interior bottom can be, e.g., 0.25, 0.5, 1.0, 1.5, 2.0, 2.5, or 3.0 inches in height along the entire length of carrier (20) or substantially the entire length of carrier (20) (e.g., the space may encompass all but, e.g., 0.5, 1.0, 2.0, or 3.0 inches of the entire length of carrier (20) from back to front). All or a portion of raised floor (50) may be porous with a plurality of slits or holes that allow liquid or solid waste to fall from the interior of carrier (20) through raised floor (50) to the space below. In other embodiments, the space below raised floor (50) is sized to permit placement of an absorbent liner or pad that can be used to capture liquid and/or solid waste produced by the animal (e.g., urine, feces, or vomit) while resident in carrier (20) that falls through the slits or holes into the space below. Absorbent pads for use in the invention are described in, e.g., U.S. Pat. Nos. 7,678,221; 7,655,829; 6,841,244; 6,479,415; 5,509,915; and 5,486,167, each of which is incorporated by reference herein.

Alternatively, raised floor (50) may be solid, thereby preventing movement of liquid or solid materials from the interior of the carrier to the space below. The space below raised floor (50) may also be sized to permit placement of materials that provide a source of heat or cold to the animal in order to maintain a comfortable temperature while resident in carrier (20).

Raised floor (50) may be secured to carrier (20) using snaps, magnets, pins, latches, friction fit, or other methods known in the art. Access to the space below raised floor (50) may be provided by releasing raised floor (50) from carrier (20) and lifting it up and away from the space or by removing it from carrier (20) through, e.g., one of the one or more doors in the walls ((110), (100), or (90)) or top (80) of carrier (20); raised floor (50) being sized to pass easily through the door(s). Alternatively, access to the space below raised floor (50) may be provided through an access panel in one or more of the side walls (90) (or the back (100) or front (110) walls) of carrier (20). The access panel can be attached to carrier (20) by one or more hinges that allow the access panel to be secured in an open and/or closed position. The access panel may also be configured to be reversibly attached and detached from carrier (20). The access panel can also be configured to provide access only to the space below raised floor (50) or to the entire interior of carrier (20).

In other embodiments, funnel (10), carrier (20), accessory components (e.g., foot insertion point (26), wall protector (22) and non-skid feet (24), etc.) are made with durable materials (e.g., plastic). In other embodiments, funnel (10), carrier (20), and accessory components are designed so as to be visually appealing. Carrier (20) may be made using the same rigid, molded material (e.g., rigid or semi-rigid plastic) as funnel (10). In other embodiments, carrier (20) is made using fabric (e.g., canvas) alone or fabric that covers a steel frame. Desirably, carrier (20), when made using fabric alone, is stiff enough so as to be capable of retaining its shape when loading an animal into carrier (20) using funnel (10).

In other embodiments, the interior and/or exterior of carrier (20) can have a color that is calming to the animal. The interior and/or exterior of carrier (20) and/or funnel (10) may also have one or more patterns. Alternatively, the interior and/or exterior of carrier (20) and/or funnel (10) may have a solid color (e.g., black, dark grey, blue, green, red, and purple). In an embodiment, the interior and the exterior of carrier (20) and/or funnel (10) are different colors and/or patterns or the same color and/or patterns.

To prevent against, or reduce the likelihood of, corrosion or rusting, carrier (20) and/or funnel (10) and/or other elements of carrier (20) (e.g., hinges, latches, and other moving parts) can be manufactured using stainless steel or non-corrosive materials other than, e.g., plastic. Interlocking channels between funnel (10) and carrier (20) can be constructed to withstand more than average levels of wear and tear.

Carrier (20) may also include handle (70) or a handle-like design on the top portion (80) to allow for easier transport of carrier (20). Handle (70) can also be configured to fit into the space remaining after removal of funnel (10) from carrier (20) after putting the animal inside. In an embodiment, handle (70) can be fastened to top (80) of carrier (20) by reaching into and through funnel (10) and securing handle (70) using one of the types of connectors discussed herein. Once handle (70) is fastened to carrier (20), funnel (10) can be detached from carrier (20). If funnel (10) is telescoping, it can be retracted so that handle (70) may be more easily fastened to carrier (20).

Carrier (20) may also include one or more additional, optional, accessories. For example, carrier (20) may include a receptacle for a device that is designed to release a pheromone or aroma that naturally reduces anxiety in the animal (e.g., lavender oil, valerian root oil, FELIWAY®, DAP® Dog Appeasing Pheromone (Ceva Sante Animale, Lenexa, Kans.), and COMFORT ZONE® (Farnam Pet Products, Phoenix, Ariz.)). The device may include a pad or other solid substrate, or a liquid container, that contains an anxiety-relieving pheromone or aroma that diffuses or evaporates from the device (e.g., by air movement or the application of heat from a heat source included with the device) or that is otherwise sprayed or released over time into carrier (20). Carrier (20) may also include a receptacle for a filter that absorbs odors present in carrier (20). The filter may be a carbon filter that can be replaced and discarded, as necessary. Carrier (20) may also include a water bottle that provides drinking water for the animal (see, e.g., U.S. Pat. No. 6,561,129) or a food dispenser for feeding the animal during transport. Food and water dispensers, or other items, may be attached, for example, to a door of carrier (20) or one of the walls (e.g., (110), (100), or (90)) or top (80) of carrier (20) by hooks integrated into the dispensers.

Carrier (20) may also include one or more wheels (e.g., 2, 3, or 4 wheels) affixed to bottom (120) that facilitate transport of carrier (20). Carrier (20) may also include a handle (e.g., a telescoping handle) that is or can be attached to the outside of carrier (20) (e.g., the front or back of carrier (20)) and allows the carrier to be easily transported by a person when it includes wheels.

Carrier (20) may also be collapsible.

Connecting the Funnel to the Carrier

Funnel (10) may include a connection harness or ring, e.g., as integral or separate components of funnel (10) and carrier (20), that can be used to securely fasten and unfasten funnel (10) to carrier (20) (e.g., using one or more quick release connector(s), clamps, or couplings (60). The connection harness or ring, the quick release connectors, the clamps, or the couplings can be made from, for example, stainless steel or other materials, such as plastic (e.g., rigid plastic) or rubber. In an embodiment, the connection harness or ring of funnel (10) interlocks with a corresponding connection harness or ring on carrier (20).

In an embodiment, the connection harness/ring of funnel (10) and carrier (20) may be a quick connect-type coupling that can be tightened by engaging the connection harnesses/rings of funnel (10) and carrier (20) and making, e.g., a quarter turn to securely connect (and reverse quarter turn to disconnect). For example, the connection harnesses/rings of funnel (10) and carrier (20) may be a Storz-type coupling that connects using interlocking hooks and flanges (also referred to as a sexless coupling; see, e.g., U.S. Pat. No. 6,102,444, incorporated herein by reference).

In another embodiment, funnel (10) and carrier (20) can be securely fastened without additional hardware (e.g., a separate connection harness or ring), with funnel (10) and carrier (20) adapted to be interlocking with each other.

Alternatively, the connection harness or ring of funnel (10) can be configured to be retrofitted to a traditional animal carrier, such as those described in, e.g., U.S. Pat. Nos. 4,852,520; 6,427,631; 6,523,499; and 6,539,895, each of which is incorporated herein by reference. An example of funnel (10) that is adapted or configured for retrofit use is shown in FIGS.

8 and 9, which shows four quick release clamps at the attachment point that can be used to connect retrofit funnel (10) to, e.g., an opening of the carrier, such as the doorway of a traditional animal carrier. Retrofit funnel can also be configured to include fewer than four clamps or couplings (e.g., 1, 2, or 3 clamps or couplings) or more than four clamps or couplings (e.g., 5, 6, 7, or 8 clamps or couplings) at the attachment point (e.g., on a connection harness or ring).

In an embodiment, funnel (10) connects to carrier (20) in an easy two-step process. The first step involves inserting the attachment point of funnel (10) into the opening of a port or harness on carrier (20) for receiving funnel (10). The second step involves securing funnel (10) to carrier (20). This may be achieved in one of several different ways. For example, the connection harness/ring of funnel (10) may be secured to the connection harness/ring of carrier (20) using a standard threaded male and female coupling that can be secured by engaging the threads of the male and female couplers until tight.

Alternatively, funnel (10) and carrier (20) may be connected using a cam and groove-type coupling.

In other embodiments, the connection harness/ring of funnel (10) may be securely fastened to carrier (20) using snaps, pins (e.g., cotter pins), latches, and/or magnets or other means of attachment known in the art.

Once the animal is inside carrier (20), funnel (10) may be disengaged from carrier (20) and the opening in carrier (20) may be closed or sealed to prevent egress of the animal from carrier (20). For example, the opening can be sealed using a solid plug (e.g., a plastic or metal plug) that engages the connection harness/ring of carrier (20) in the same manner as funnel (10). The plug prohibits the animal (e.g., a cat or dog) from exiting through the opening previously engaged by funnel (10). The connection harness/ring of carrier (20) may also be configured to permit insertion of the plug into the top of carrier (20) prior to removal of funnel (10) to ensure the safety of both the animal and human. In this case, the plug is inserted into the opening by reaching through funnel (10) and securing the plug into the connection harness/ring of carrier (20). Once the plug is connected, funnel (10) can be safely removed from carrier (20). The plug may also include a handle portion that allows the handler to easily carry carrier (20) once secured.

Alternatively, carrier (20) may have a panel attached to its roof that slides from an open position to a closed position (either before or after removal of the funnel), thereby sealing the hole and preventing egress of the animal from carrier (20). Alternatively, the panel may flip from an open position to a closed position to seal the hole remaining once funnel (10) is removed from carrier (20). The panel may be secured in the open and/or closed position using, e.g., one or more snaps, pins, magnets, or latches (e.g., the latch may have a catch that can be engaged to open/close the panel) or by friction fit.

Carrier (20) may also include a pamphlet or instructional video (e.g., digital video disc (DVD) or Blu-Ray disc (BD)) that provides the handler with information about the use, maintenance, and cleaning of animal carrier (20) and one or more of its accessories.

Storage of the Carrier Accessories

Carrier (20) may be configured to include one or more compartments for easy storage of one or more of its accessories, including one or more of funnel (10), handle (70), insertion point (26), and extra absorbent pads. The compartment(s) may be present on the side(s) (90), back wall (100), or exterior of bottom (120) of carrier (20). The compartment(s) may be made from a fabric material or from rigid or semi-rigid plastic. The compartment(s) may be molded into carrier (20) or they may be attachable and detachable from carrier (20).

Other Embodiments

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth.

All publications and patent applications mentioned in this specification are herein incorporated by reference to the same extent as if each independent publication or patent application was specifically and individually indicated as being incorporated by reference in their entirety.

What is claimed is:

1. A pet carrier for transporting a small, live pet animal comprising:
   a) a body defining a housing for the animal, the body comprising a substantially planar bottom portion connected to a substantially planar top portion by two side walls, a back wall, and a front wall, each of which are affixed at the periphery of said top and bottom portions and in a substantially perpendicular orientation thereto, wherein said top portion or said back wall comprises a first opening sized and shaped to permit movement of said animal into said carrier and one or more of said side walls, back wall or front wall comprises one or more slits or holes to allow for air circulation,
   b) a funnel comprising a first open end in fluid communication with a second open end through a neck portion, said first open end being larger in diameter than said second open end, said second open end being adapted for attachment to, and detachment from, said first opening of said body, and said funnel being sized to permit passage of said animal through said funnel and being oriented to convey said animal by gravity into said carrier when said second end of said funnel is attached to said first opening of said body; and
   (c) a detachable or slidable cover sized and shaped to reversibly close or seal the first opening of said body when said second end of said funnel is disengaged from said first opening of said body to prevent egress of the animal from the interior of the carrier,
   wherein said animal is at least the size of a cat or dog and said carrier is used for transporting said live pet animal by hand.

2. The carrier of claim 1, wherein said first opening of said body is in said top portion.

3. The carrier of claim 2, wherein said carrier further comprises a second opening in said front wall sized and shaped to permit movement of said animal into and out of said carrier, said second opening comprising a gate pivotally mounted in said second opening and capable of moving between an open and a closed configuration, said gate further comprising a latch for retaining said gate in a closed position and said front wall comprising a locking pin adapted to engage said latch to retain said gate in said closed position.

4. The carrier of claim 1, wherein said first opening of said body is in said back wall.

5. The carrier of claim 1 further comprising a handle affixed to an exterior of said top portion or to the cover.

6. The carrier of claim 1 further comprising one or more wall protectors affixed to an exterior of said carrier.

7. The carrier of claim 6, wherein said one or more wall protectors are affixed to said back or front wall.

8. The carrier of claim 1 further comprising one or more non-skid feet affixed to an exterior of said bottom portion.

9. The carrier of claim 1 further comprising a substantially planar raised floor portion that is positioned above said bottom portion and that defines a space between said raised floor portion and said bottom portion.

10. The carrier of claim 9, wherein said raised floor portion is removable from said carrier.

11. The carrier of claim 9, wherein said raised floor portion comprises a plurality of holes or slits.

12. The carrier of claim 9 further comprising an access panel on at least one of said side walls, said front wall, or said back wall that is sized and shaped to provide access into said space between said raised floor portion and said bottom portion.

13. The carrier of claim 9, wherein said space between said raised floor portion and said bottom portion is between 0.5 and 3.0 inches in height along substantially the entire length of said carrier from back to front.

14. The carrier of claim 1 further comprising an insertion point at or near the bottom of said carrier that is sized and shaped to accommodate a human foot, wherein pressure can be applied to said insertion point to stabilize said carrier during insertion of said animal into said carrier.

15. The carrier of claim 14, wherein said insertion point comprises a recessed area or a substantially planar ledge on one or more of said side walls, said back wall, or said front wall.

16. The carrier of claim 1 further comprising a liquid or solid dispensing device detachably fastened to an exterior portion of said carrier and comprising a spout that extends into an interior portion of said carrier for delivering said liquid or solid to said interior portion.

17. The carrier of claim 1 further comprising a diffuser detachably fastened to an exterior portion of said carrier, wherein said diffuser comprises a mechanism for releasing a pheromone or aroma in the form of a spray, a mist, an aerosol, or a slow release matrix into an interior portion of said carrier.

18. The carrier of claim 1, wherein said animal is a cat, dog, rat, ferret, guinea pig, chinchilla, rabbit, chicken, raccoon, possum, or skunk.

19. The carrier of claim 1, wherein said funnel is sized from about five (5) to about thirty (30) inches in length end to end and has a diameter of about ten (10) to about thirty (30) inches at said first open end and a diameter of about five (50 to about twenty (20) inches at said second open end.

20. The carrier of claim 1, wherein said funnel comprises a substantially smooth interior.

21. The carrier of claim 1, wherein said cover comprises an insert, plug, or panel.

* * * * *